US007760608B2

(12) United States Patent
Tanabe

(10) Patent No.: US 7,760,608 B2
(45) Date of Patent: Jul. 20, 2010

(54) REPRODUCING APPARATUS

(75) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 709 days.

(21) Appl. No.: 11/479,539

(22) Filed: Jun. 30, 2006

(65) Prior Publication Data

US 2007/0014215 A1 Jan. 18, 2007

(30) Foreign Application Priority Data

Jul. 15, 2005 (JP) ............................. 2005-207137

(51) Int. Cl.
*G11B 11/00* (2006.01)
*G11B 7/085* (2006.01)
*G11B 5/09* (2006.01)
*G11B 20/10* (2006.01)
*G11B 20/00* (2006.01)
*G11B 19/02* (2006.01)

(52) U.S. Cl. .............. 369/53.37; 369/30.07; 369/30.09; 369/30.05; 369/47.55

(58) Field of Classification Search ........................ None
See application file for complete search history.

(56) References Cited

U.S. PATENT DOCUMENTS 4,809,163 A * 2/1989 Hirosawa et al. ............ 713/323

(Continued)

FOREIGN PATENT DOCUMENTS

EP  1246462 A  10/2002

(Continued)

OTHER PUBLICATIONS

The above foreign patent documents 1, 2, 4, and 5 were cited in a Feb. 23, 2010 Japanese Office Action that issued in Japanese Patent Application No. 2005-207137.

*Primary Examiner*—Wayne R Young
*Assistant Examiner*—Carl Adams
(74) *Attorney, Agent, or Firm*—Cowan, Liebowitz &Latman, P.C.

(57) ABSTRACT

A recording/reproducing unit for recording/reproducing information data on/from a recording medium, an initialization unit for initializing the recording medium in one of a first initialization mode in which information data recorded in all recording areas of the recording media is erased and a second initialization mode in which management data for information data recorded on the recording medium is erased from certain areas of the recording medium and erasion is not performed on other recording areas, and a control unit for controlling the initialization unit in accordance with an instruction to shut off a power of the apparatus during initialization, wherein processing by the initialization unit is changed between a case where the power-off instruction is received during initialization in the first initialization mode and a case where the power-off instruction is received during initialization in the second initialization mode.

14 Claims, 18 Drawing Sheets

U.S. PATENT DOCUMENTS

| | | | |
|---|---|---|---|
| 5,446,904 A * | 8/1995 | Belt et al. | 713/323 |
| 5,574,897 A * | 11/1996 | Hermsmeier et al. | 707/1 |
| 5,968,142 A * | 10/1999 | Frederic | 710/18 |
| 6,104,886 A | 8/2000 | Suzuki et al. | |
| 6,671,249 B2 * | 12/2003 | Horie | 369/275.3 |
| 6,687,784 B2 * | 2/2004 | Douniwa et al. | 711/103 |
| 7,185,140 B2 * | 2/2007 | Nakajima | 711/103 |
| 7,209,558 B2 | 4/2007 | Okuyama | |
| 2002/0141580 A1 | 10/2002 | Okuyama | |
| 2005/0013154 A1 * | 1/2005 | Honda et al. | 365/145 |
| 2006/0112195 A1 | 5/2006 | Aoyama | 710/10 |

FOREIGN PATENT DOCUMENTS

| | | |
|---|---|---|
| JP | H08-161748 A | 6/1996 |
| JP | H11-088744 A | 3/1999 |
| JP | 2002-300517 A | 10/2002 |
| JP | 2005-166178 A | 6/2005 |

* cited by examiner

000b: COMPLETE ERASION OF DISK
001b: MINIMUM ERASION OF DISK
011b: RESERVATION CANCEL OF RZONE
100b: ERASION OF RZONE
101b: UNCLOSE OF LAST BORDER
110b: ERASION OF BORDER

FIG. 6

| BIT BYTE | 7 | 6 | 5 | 4 | 3 | 2 | 1 | 0 |
|---|---|---|---|---|---|---|---|---|
| 0 | | | OPERATION CODE (04h) | | | | | |
| 1 | LUN (OBSOLETE) | | | FMTDATA(1) | COMPLST | FORMAT CODE (001b) | | |
| 2 | | | | RESERVED | | | | |
| 3 | (MSB) | | | INTERLEAVE VALUE (0) | | | | |
| 4 | | | | | | | | (LSB) |
| 5 | VENDOR-SPECIFIC | | | RESERVED | | NACA | FLAG | LINK |
| 6 | | | | PAD | | | | |
| 7 | | | | | | | | |
| 8 | | | | | | | | |
| 9 | | | | | | | | |
| 10 | | | | | | | | |
| 11 | | | | | | | | |

| BIT BYTE | 7 | 6 | 5 | 4 | 3 | 2 | 1 | 0 |
|---|---|---|---|---|---|---|---|---|
| 0 | | | | | | | | |
| 1 | | | | | | | | |
| 2 | | | | | | | | |
| 3 | | | | | | | | |
| 4 | (MSB) | | | NUMBER OF BLOCKS | | | | |
| 5 | | | | | | | | (LSB) |
| 6 | FORMAT TYPE | | | | | | RESERVED | |
| 7 | (MSB) | | | TYPE DEPENDENT PARAMETER | | | | (LSB) |

00h: FULL FORMAT
05h: ZONE FORMAT
15h: DVD-RW QUICK

REPRODUCING APPARATUS

BACKGROUND OF THE INVENTION

1. Field of the Invention

The present invention relates to a reproducing apparatus, and more particularly, to a technique for transmitting information data that is reproduced from a storage medium to an external apparatus to record the data onto another storage medium.

2. Related Background Art

There have been apparatuses such as digital cameras and video cameras that record/reproduce captured image data as digital data to/from a memory card and/or a magnetic tape. More recently, disk video cameras have also emerged that record/reproduce taken image data on/from an optical disk such as a digital versatile disk (DVD) (see Japanese Patent Application Laid-Open No. 2004-095164, for example).

Since optical disks or memory cards used with such disk video cameras are relatively expensive, users may copy recorded image data to a bulk recording medium and then erase the data on a disk so that use the disk repetitively.

More specifically, one of possible ways is to transmit image data recorded on an optical disk or a memory card to a personal computer (PC) to save the data on a hard disk drive (HDD) or an optical disk of a large capacity that is contained in or mounted to the PC. In such a case, the user connects the PC with the digital/video camera with a high-speed serial interface such as USB and IEEE1394 interfaces. And the user transfers data recorded on a memory card or an optical disk to the bulk recording unit that is contained in or mounted to the PC. Once saving is complete, the user erases the data recorded on the rewritable optical disk or memory card in the disk video camera and then uses the video camera.

One way to erase data on a disk is to execute erasure through operation of a menu provided on a disk video camera itself. Another way is to select a menu for erasure in an application on a PC to erase data on an optical disk or memory card that is mounted to a video camera.

As mentioned above, when capturing a picture with a video camera, one has to erase data recorded on a disk and perform formatting (i.e., initialization) for making the disk writable.

The initialization can be done in a number of ways depending on the type of disk medium. For example, all data on a disk may be erased or only data in some administration information areas may be erased. When only partial data is erased, recording of data onto the disk becomes possible, however, functions may be limited compared to complete formatting. On the other hand, complete formatting has no such limitation although it takes longer time than partial formatting.

One cannot use a camera to photograph while initialization is carried out on a video camera. Thus, when one comes to wish to take images using another disk after starting initialization, he/she need to stop the initialization such as by shutting off a power of the apparatus.

As described above, there is a problem of necessity to perform initialization later again in order to record data on a disk initialization of which has been interrupted in such a manner.

SUMMARY OF THE INVENTION

An aspect of the invention is to solve the problem outlined above.

Another aspect of the invention is to enable execution of optimal initialization when a plurality of initialization methods are selectively employed for initialization.

To solve the problem, a recording/reproducing apparatus according to one aspect of the invention comprises recording/reproducing means for recording/reproducing information data on/from a recording medium; initialization means for initializing a recording medium in one of a first initialization mode in which information data recorded in all recording areas of the recording medium is erased and a second initialization mode in which management data for information data recorded on the recording medium is erased from certain areas of the recording medium and erasion is not performed on other recording areas; instruction input means for receiving an instruction to shut off a power of the apparatus; and control means for controlling the initialization means in accordance with a power-off instruction during initialization, wherein the control means varies processing by the initialization means between a case where a power-off instruction is received during initialization in the first initialization mode and a case where a power-off instruction is received during initialization in the second initialization mode.

BRIEF DESCRIPTION OF THE DRAWINGS

FIG. 6 illustrates the structure of a transmitted command;

FIG. 7 illustrates the structure of a transmitted command;

FIG. 8 illustrates details of a transmitted command;

DESCRIPTION OF THE PREFERRED EMBODIMENTS

Exemplary embodiments of the invention will be described in detail with respect to accompanying drawings.

Figure 1:
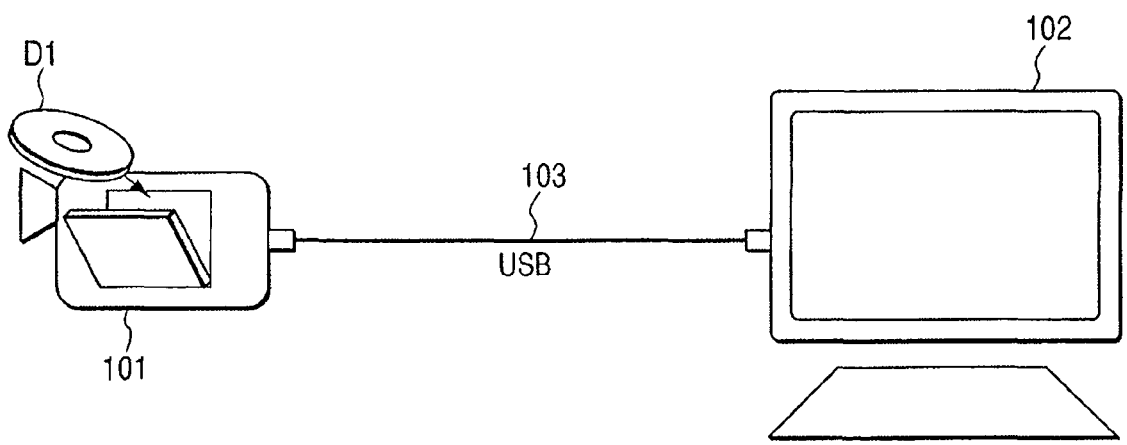
FIG. 1 illustrates a configuration of a recording/reproducing system as an embodiment of the invention.

FIG. 1 illustrates an example of configuration of a data transmission system to which the present invention is applied.

The system of FIG. 1 comprises a video camera 101 that records/reproduces captured image data to on optical disk D1 such as a DVD-RW, and a PC 102.

The video camera 101 and PC 102 each have a USB interface and data transmission is realized by connecting a USB cable 103 to the USB interfaces. This embodiment refers to a case Mass Storage is used as transmission protocol for USB.

Figure 2:
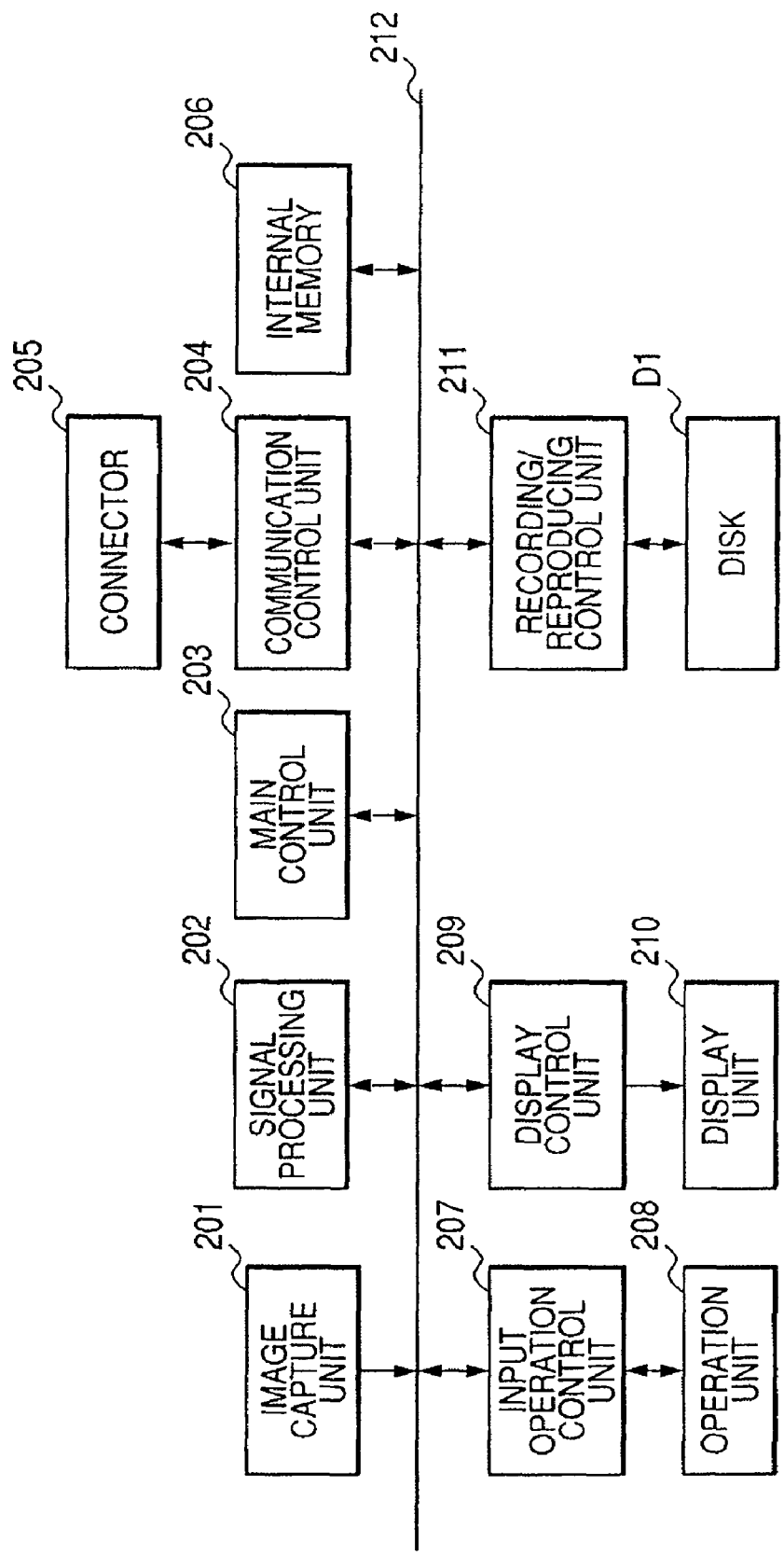
FIG. 2 illustrates a configuration of a video camera in the embodiment.

FIG. 2 is a block diagram showing essential components of the video camera 101.

An image capture unit 201 takes images of an object to generate motion image data and output the data onto a bus 212. At the time of recording, a signal processing unit 202 encodes motion image data output by the image capture unit 201 in a known encoding technique and outputs the encoded data to a recording/reproducing control unit 212, and at the time of reproduction, decodes motion image data reproduced from the disk D1 to output the decoded data to a display control unit 210. A main control unit 203 is connected to each component via the bus 213 and instructs control of the components according to software running on the main control unit 203. The communication control unit 204 performs communication control according to Mass Storage standard when it is connected to an external device, that is, the PC 102 of FIG. 1, through the USB cable 104 via a USB device connector 205. Reference numeral 206 denotes internal memory that stores various software programs used at the main control unit 203 and/or various information transmitted from the PC 102.

An input operation control unit 207 identifies key information when the user makes input to the operation unit 208 and passes it to software running on the main control unit 203. The display control unit 209 generates an image to be displayed on the display unit 210 and controls display. The recording/reproducing control unit 211 controls recording/reproduction of captured data on the optical disk D1 and transfer of read-out data to the internal memory 206. Read-out data is transmitted to outside via the communication control unit 204 or transferred to the display unit via the display control unit 210.

Figure 3:
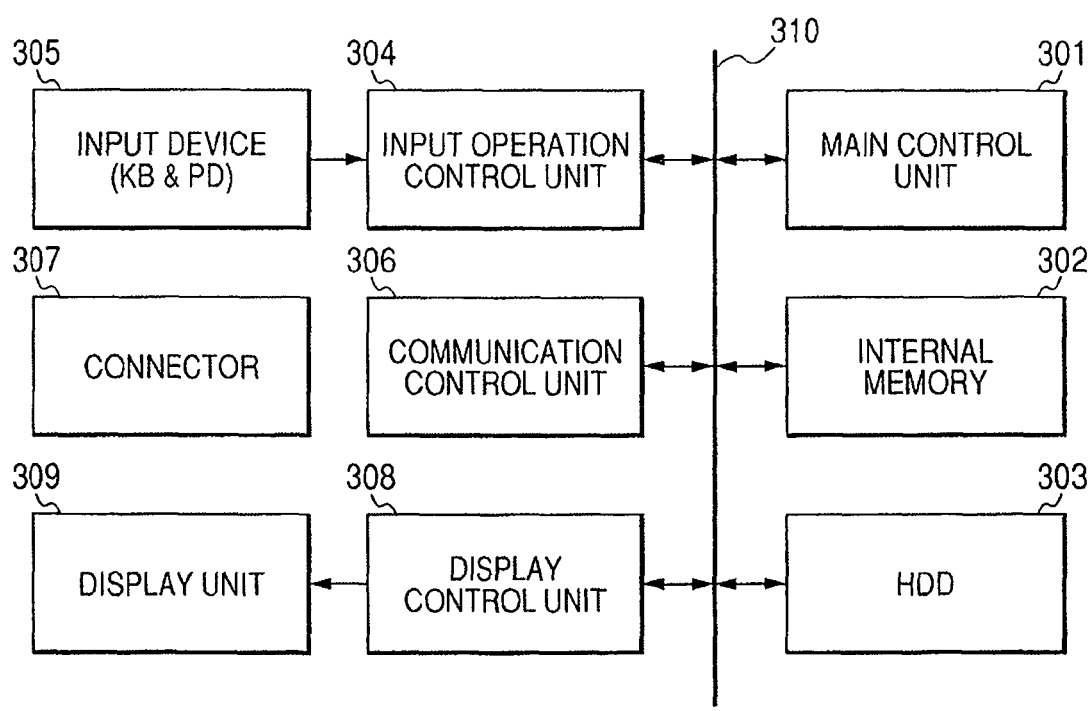
FIG. 3 illustrates a configuration of a PC in the embodiment.

A block diagram showing configuration of essential portions of the PC 102 is shown in FIG. 3.

As shown, the PC 102 includes a main control unit responsible for control of the entire apparatus (being a CPU) 301, internal memory 302 to which an operating system (OS) or various application programs are loaded, a hard disk drive (HDD) 303 that stores an OS as well as various application programs including an application program for control of the video camera 101 used in the embodiment, an input operation control unit 304 that accepts input on an input device 305 that comprises a pointing device such as a mouse and a keyboard and outputs the input to the main control unit 301, a communication control unit 306 that transmits/receives data via the USB host connector 307, a display control unit 308 that outputs video signals to a display unit 309 that is a CRT or a liquid crystal display and/or draws data in internal video memory in accordance with an instruction from the main control unit 301, and a data bus 310 that communicates data among the functional blocks.

Now, ATAPI commands will be described that are used when data on the optical disk D1 inserted in the video camera 101 is erased from an application on the PC 102 to the video camera 101. As details of the commands are described in ATAPI standard, detailed description is omitted here. Commands defined in ATAPI for erasing data on a disk include BLANK command and FORMAT UNIT command.

BLANK command is for instructing erasure of data (initialization) on a disk.

Figures 4, 5:
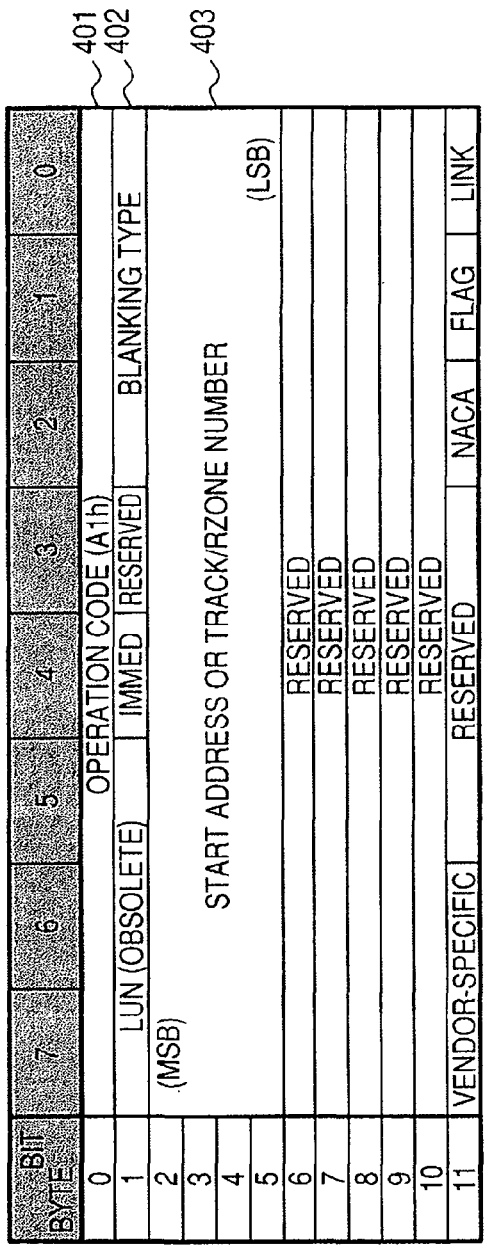
FIG. 4 illustrates the structure of a transmitted command.
FIG. 5 illustrates details of a transmitted command.

FIG. 4 illustrates the structure of BLANK command.

In field 401, Operation Code is put, that is, 0xA1 representing BLANK command is put. Immed bit of field 402 indicates timing of requesting a response: when 1 is set, a response immediately returned after the command is executed, and when 0 is set, whether to return a response is specified after command is completed. Blanking Type is a field that indicates modes of erasing data on the optical disk D1. Modes of erasion that are indicated in Blanking Type field are shown in FIG. 5.

In FIG. 5, complete erasion of data on a disk (000b) also deletes data in logical address areas except part of Recording Management Area (RMA) that exists in the inner tracks of the disk. Minimal erasion of disk data (001b) deletes data in RMA and read-in area except for some areas.

Reservation cancel of Rzone (011b) cancels reservation of Rzone with Border zone completely closed. Erasion of Rzone (100b) erases data in the last Rzone.

UnClose of last Border (101b) erases border that is recorded in the end of the disk. Erasion of Border (110b) erases data from read-in area or border-in area to read-out or border-out area.

Field 403 is a field that specifies a track address or Rzone number at which processing is started.

On the other hand, FORMAT UNIT command is for formatting a medium in logical blocks that can be addressed through host-defined options.

FIG. 6 shows the structure of FORMAT UNIT command.

Field 601 is Operation Code, in which 0×04 that identifies FORMAT UNIT command is set.

When FORMAT UNIT command is used for control, after transmitting the command shown in FIG. 6, data that consists of 4 byte header followed by data called format descriptor is transmitted as shown in FIG. 7.

Field 701 indicates block number.

The format type of field 702 indicates formatting modes. Types of formatting specified here are shown in FIG. 8.

That is, when Full Format is specified, full formatting is executed. When Zone Format is specified, a specified Zone is formatted. In the case of DVD-RW QUICK, Quick formatting is executed on a DVD-RW disk.

In field 703, a parameter that depends on the format type of field 702 is put.

The configurations of video camera 101 and PC 102 in the embodiment and BLANK and FORMAT commands of ATAPI have been thus far described.

The PC 102 selects one of the BLANK command and FORMAT UNIT command for use depending on an application in the disk drive. In this embodiment, BLANK command is assumed to be used.

Figure 9:
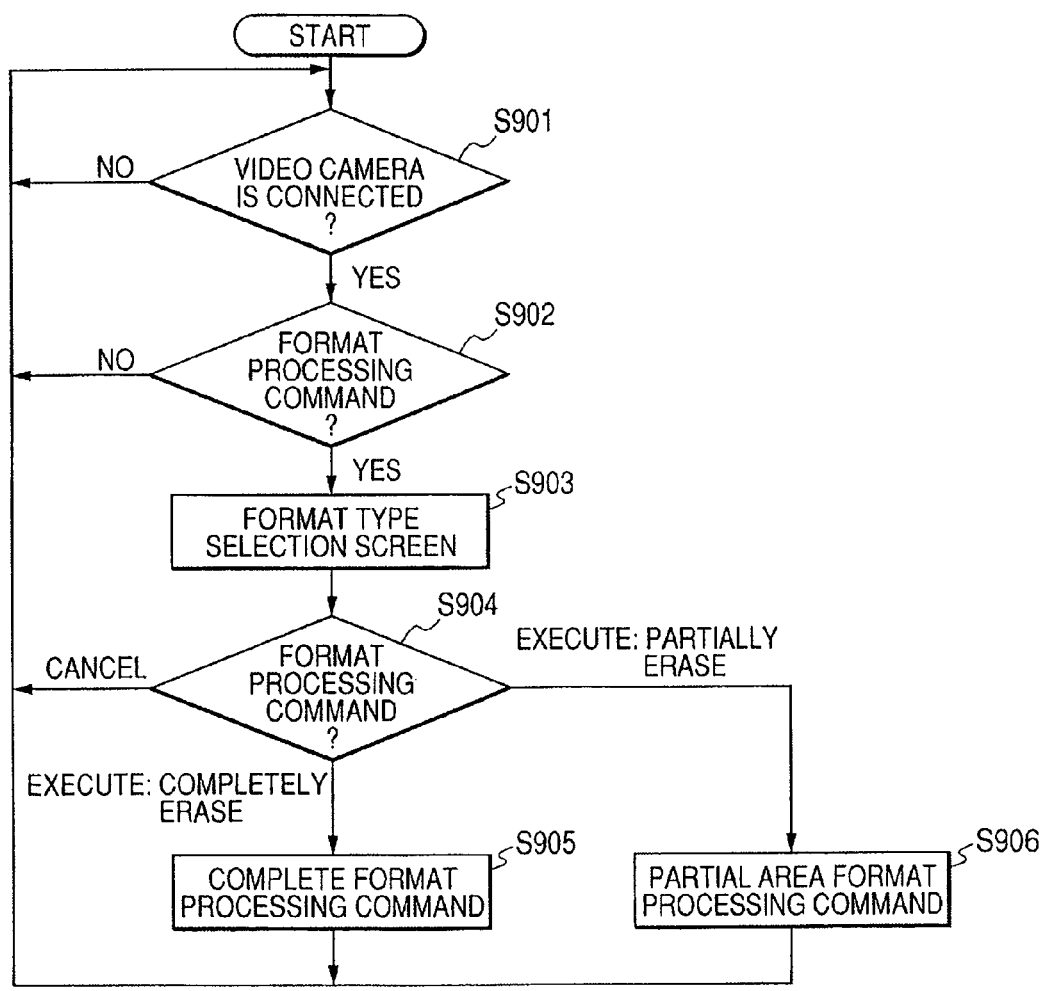
FIG. 9 shows a flowchart illustrating processing by an application on the PC.

Processing by an application program on the PC 102 in the embodiment will be described. FIG. 9 is a flowchart illustrating processing on the PC 102. When the user operates the PC 102, an application is launched to display screen 1001 shown in FIG. 10, and the flow proceeds to step S901.

At step S901, it is checked if the video camera 102 is connected with the PC 102 via the USB cable 103. Step S901 is repeated until the video camera is connected, and once connection is confirmed, the flow goes to step S902.

The video camera in this embodiment is one conforming to USB Mass Storage Class and recognizes a device by a protocol that conforms to USB standard when it is connected to the PC 102 via the communication USB cable 103.

Figure 10:
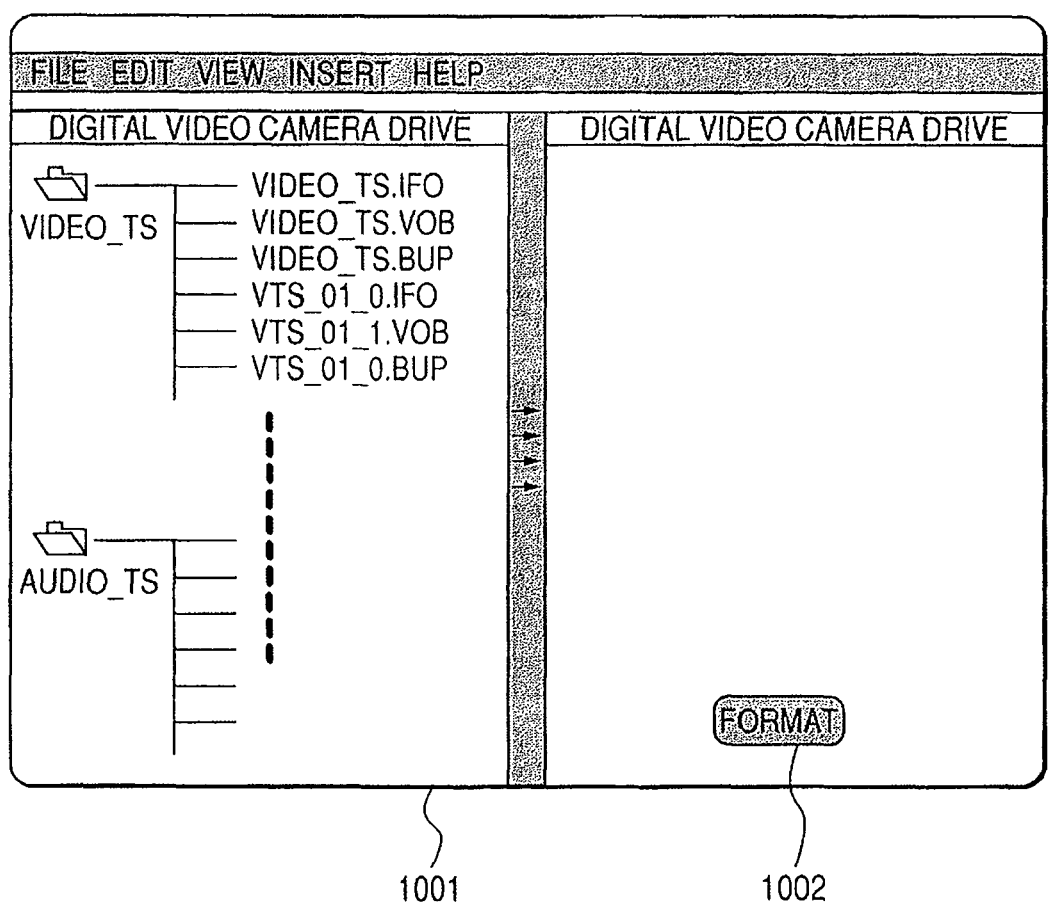
FIG. 10 illustrates a display screen for the application on the PC.

At step S902, the screen 1001 shown in FIG. 10 is presented on the display unit 309 by the display control unit 308 and it is checked whether the formatting button 1002 is depressed.

Figure 11:
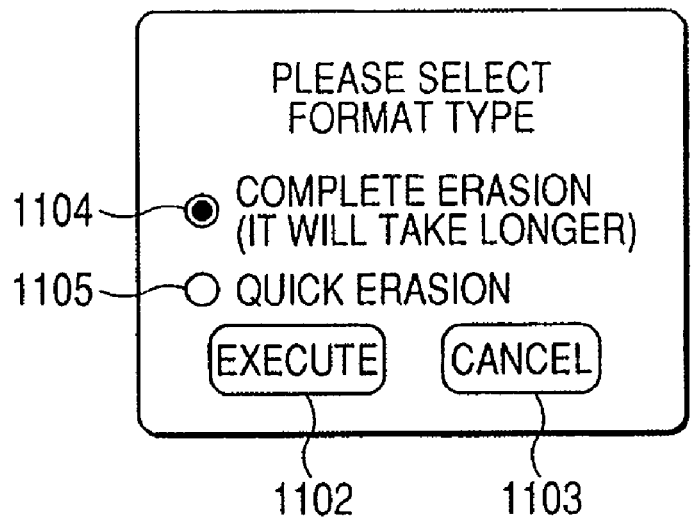
FIG. 11 illustrates a screen for selecting format processing provided by the application on the PC.

When the formatting button 1002 is depressed, it indicates a formatting instruction is accepted, and the flow proceeds to step S903. At step S903, a screen for selecting a formatting type 1101 shown in FIG. 11 is displayed and the user is prompted to select one, and the flow proceed to step S904. The screen for formatting type selection is also displayed on the display unit 309 by the display control unit 308, with including a button 1102 for executing formatting, a button 1103 for canceling formatting, a selection tab for complete formatting 1104, and a selection tab for simplified formatting 1105.

When the execution button 1102 is depressed on the formatting type selection screen 1101, execution of formatting is notified to the input operation control unit 304 and the main control unit via the input device 305. Then, at step S904, it is determined which of the selection tab for complete formatting 1104 and the selection tab for simplified formatting 1105 is selected. If the selection tab for complete formatting is selected, the flow proceeds to step S905, and if the selection tab for simplified formatting 1106 is selected, the flow proceeds to step S906. If the formatting cancel button 703 is depressed, formatting is terminated and the flow returns to step S901.

At step S905, BLANK command is transmitted in order to completely erase data recorded on the optical disk D1 that is mounted in the video camera 101.

Figure 12:
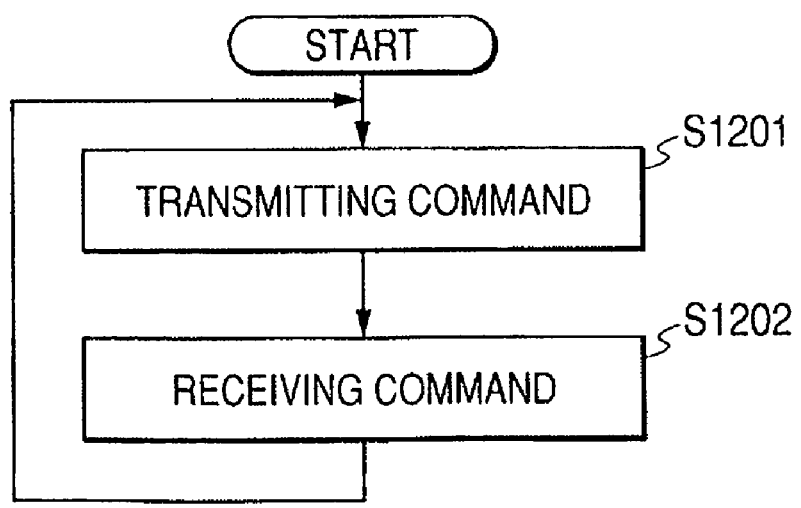
FIG. 12 is a flowchart illustrating transmission/reception of a command on the PC.

FIG. 12 is a flowchart illustrating processing that is done when a command is issued. At step S1201, BLANK command is stored in Command Block Wrapper (CBW) of Mass Storage and transmitted.

At step S1202, the command is received from the video camera 101 via the Command Status Wrapper (CSW) of Mass Storage.

The description returns to step S905. At step S905, to completely format the disk, complete erasion of disk data is set in Blanking Type in field 402 of BLANK command. Once the setting is done, formatting of optical disk D1 inserted in the video camera 101 is executed by way of the USB cable 103.

At step S906, BLANK command is transmitted in order to partially erase data on the optical disk D1 mounted in the video camera 101. Specifically, a value other than one for complete erasion of disk data in FIG. 6 is set in Blanking Type of field 402 in BLANK command. After the setting, formatting of the optical disk D1 inserted in the video camera 101 is executed via the USB cable 103.

Formatting process on the video camera 101 will be next described.

Figure 13:
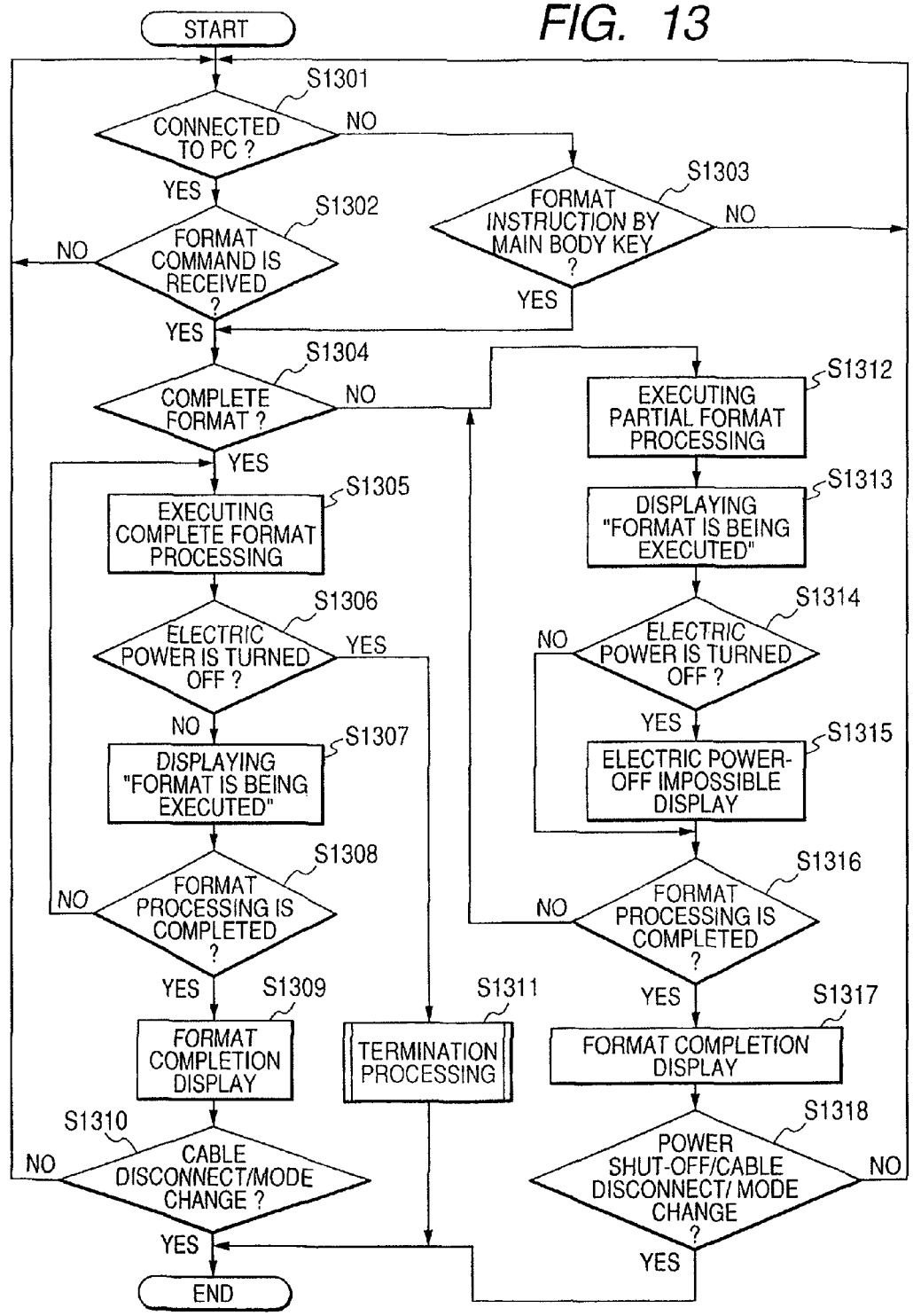
FIG. 13 is a flowchart illustrating processing on a video camera.

On the video camera 101, formatting can be carried out in response to instructions from the PC 102 or through operation of the video camera 101 itself. With both the cases in mind, formatting will be described with the flowchart of FIG. 13.

At step S1301, it is determined whether connection with the PC 102 is detected by the communication control unit 204 by way of the connector 205, and if connection is detected, the main control unit 203 is informed of it. If the video camera is connected to the PC 102 here, the flow proceeds to step S1302, and if the video camera is not connected to the PC 102, the flow proceeds to step S1303.

Processing for when the video camera is connected to the PC 102 will be described first.

At step S1302, it is determined whether the communication control unit 204 has received BLANK command from the PC 102 via the connector 205. Specifically, it is determined whether field 401 shown in FIG. 4 is set to 0xA1. If BLANK command is received, the flow proceeds to step S1304. Although cases with other commands are not described here, processing appropriate for the commands is performed, and the flow will returns to step S1301.

When the video camera 100 is operated, formatting is instructed as follows.

Figure 25:
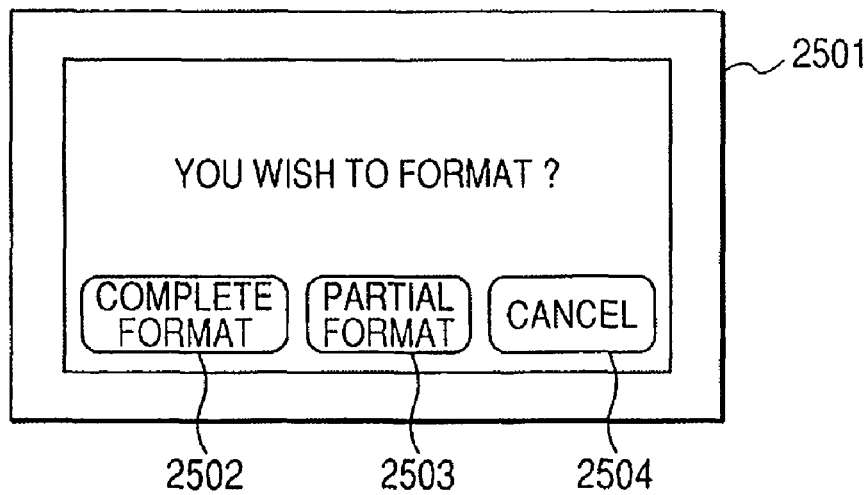
FIG. 25 illustrates a screen for selecting format processing.

When the input operation control unit 207 is informed by the operation unit 208 that a formatting button has been depressed, the main control unit 203 sends an instruction to display a screen for selecting a formatting type 2501 shown in FIG. 25 to the display control unit 209, which displays the screen on the display unit 210.

Here, as shown in FIG. 25, a complete formatting button 2502, a partial formatting button 2503, and a cancel button 2504 are displayed on the display unit 210. The user selects one of the buttons with the operation unit 208, and the main control unit 203 determines the type of formatting based on the selected button.

After the flow proceeds to step S1304 in response to BLANK command from the PC 102, the value of Blanking Type of field 402 in FIG. 4 is checked to determine whether complete erasion (001b) is set. If complete erasion is set, the flow proceeds to step S1305.

At step S1305, the recording/reproduction control unit 211 is controlled to start complete erasion process. Since complete erasion processing rewrites data in all sectors, it takes much time from start to end of formatting execution. Accordingly, during formatting, the recording/reproduction control unit 211 records time code for indicating the progress status of formatting to the internal memory 206 successively.

At step S1306, it is determined whether power-off has been instructed through the operation unit 208. If power-off is not instructed, the flow proceeds to step S1307, and if power-off is instructed, the flow proceeds to step S1311. Processing at step S1311 will be described later.

Figure 14A:
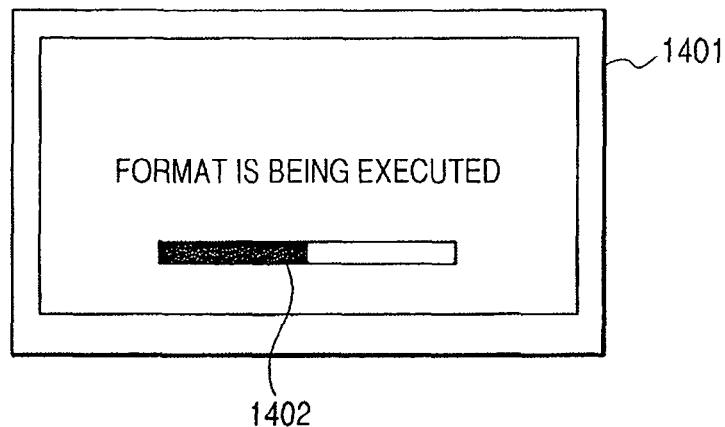
FIGS. 14A and 14B illustrate display screens provided on the video camera.

At step S1307, in order to inform the user that formatting is being continued, indication 1401 of "formatting is being executed", shown in FIG. 14A, is displayed on the display unit 210 by the display control unit 209. The progress status of formatting is indicated on a progress bar 1802 by acquiring the time code accumulated in the internal memory 206 by the main control unit 203 and informing it to the display control unit 209, and the flow proceeds to step S1308.

At step S1308, it is determined whether formatting is complete or not, and if formatting is complete, the flow proceeds to step S1309, and if formatting is not complete, the flow proceeds to step S1305 again to continue formatting.

Figure 14B:
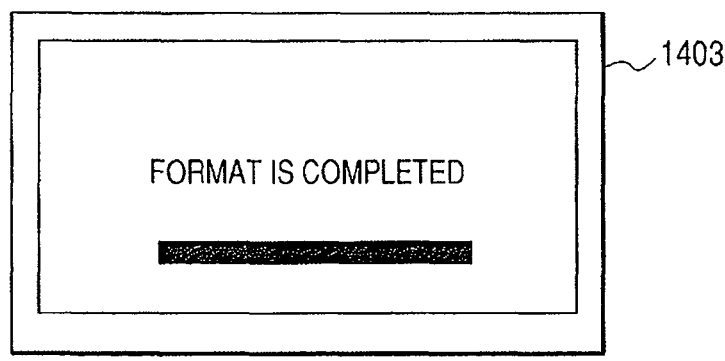

At step S1309, in order to inform the user that the complete formatting ended, the message screen 1402 indicating formatting completion, shown in FIG. 14B, is displayed on the display unit 210 by the display control unit 209, and the flow proceeds to step S1310.

At step S1310, it is determined at the main control unit 203 whether the USB cable has been disconnected and it is also determined on the basis of mode information that is reset from the input control unit 207 to the main control unit 203 whether mode has changed. If the determination shows that the USB cable is disconnected or mode has changed, the processing is terminated and USB mode is exit or another mode is entered.

If complete erasion is not set at step S1304, the flow proceeds to step S1312, where formatting is executed in accordance with the value of Blanking Type field in field 402, and the flow proceeds to step S1313.

At step S1313, a message indicating that formatting is in progress is displayed as at step S1307, and the flow proceeds to step S1314.

Figure 15:
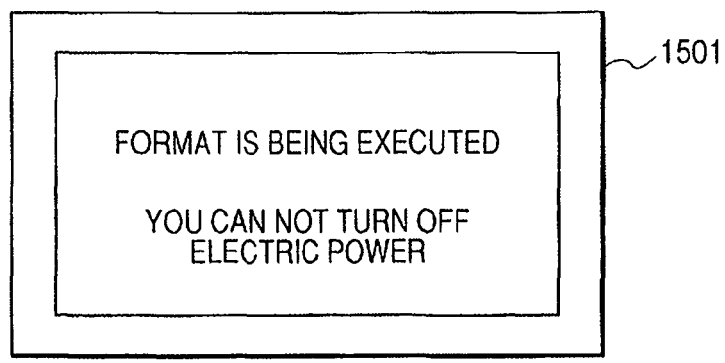
FIG. 15 illustrates a display screen provided on the video camera.

At step S1314, it is determined whether power-off has been instructed, and if power-off is requested, then at step S1315, a screen 1501 informing that power-off is impossible, shown in FIG. 15, is displayed for a certain time period, and the flow proceeds to step S1316.

At step S1316, it is determined if formatting is complete, and if formatting is complete, the flow proceeds to step S1317; and if formatting is not complete, the flow proceeds to step S1312 again to continue formatting.

At step S1317, indication that the formatting has ended is displayed on the display unit 210 as at step S1309, and the flow proceeds to step S1318.

At step S1318, it is determined whether the USB cable has been disconnected and also whether mode has changed or whether power-off is instructed. If the determination shows that the USB cable is disconnected, or shows that mode has changed, or power-off is instructed, processing is terminated and USB mode is exit or another mode is entered.

Step S1311 will be described next. Step S1311 is a process step for when power-off is instructed while complete formatting is executed.

Figure 16:
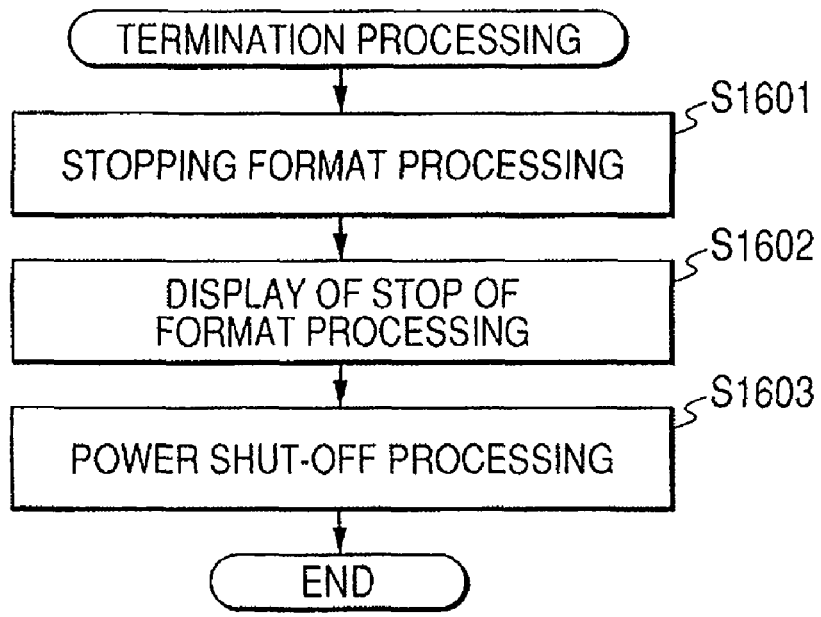
FIG. 16 is a flowchart that illustrates processing that is performed upon powering off during format processing.

FIG. 16 is a flowchart illustrating an example of termination processing at step S1311.

As FIG. 16 shows, in this embodiment, formatting is stopped if power-off is instructed during complete formatting (step S1601). And after displaying information indicating stop of formatting shown in 1701 of FIG. 17 on the display unit 210 for a certain time period (step S1602), the power of the apparatus is shut off (step S1603).

With such an arrangement, formatting is ceased and the power of the apparatus is shut off when power-off is instructed during complete formatting in this embodiment. However, partial formatting is completed in a relatively short time, thus formatting is continued without stopping it even if power-off is instructed during partial formatting.

Accordingly, if the user comes to wish to take images with the video camera 100 utilizing another disk after staring formatting, the user can stop the formatting and carry the video camera 100 to take images.

Now, the second embodiment will be described.

While, in the embodiment above, formatting is stopped at termination processing at step S1311 in response to a power-off instruction, in this embodiment, the user is allowed to select whether to continue formatting until it completes without shutting off the power the video camera or whether to stop formatting at that point.

Figure 18:
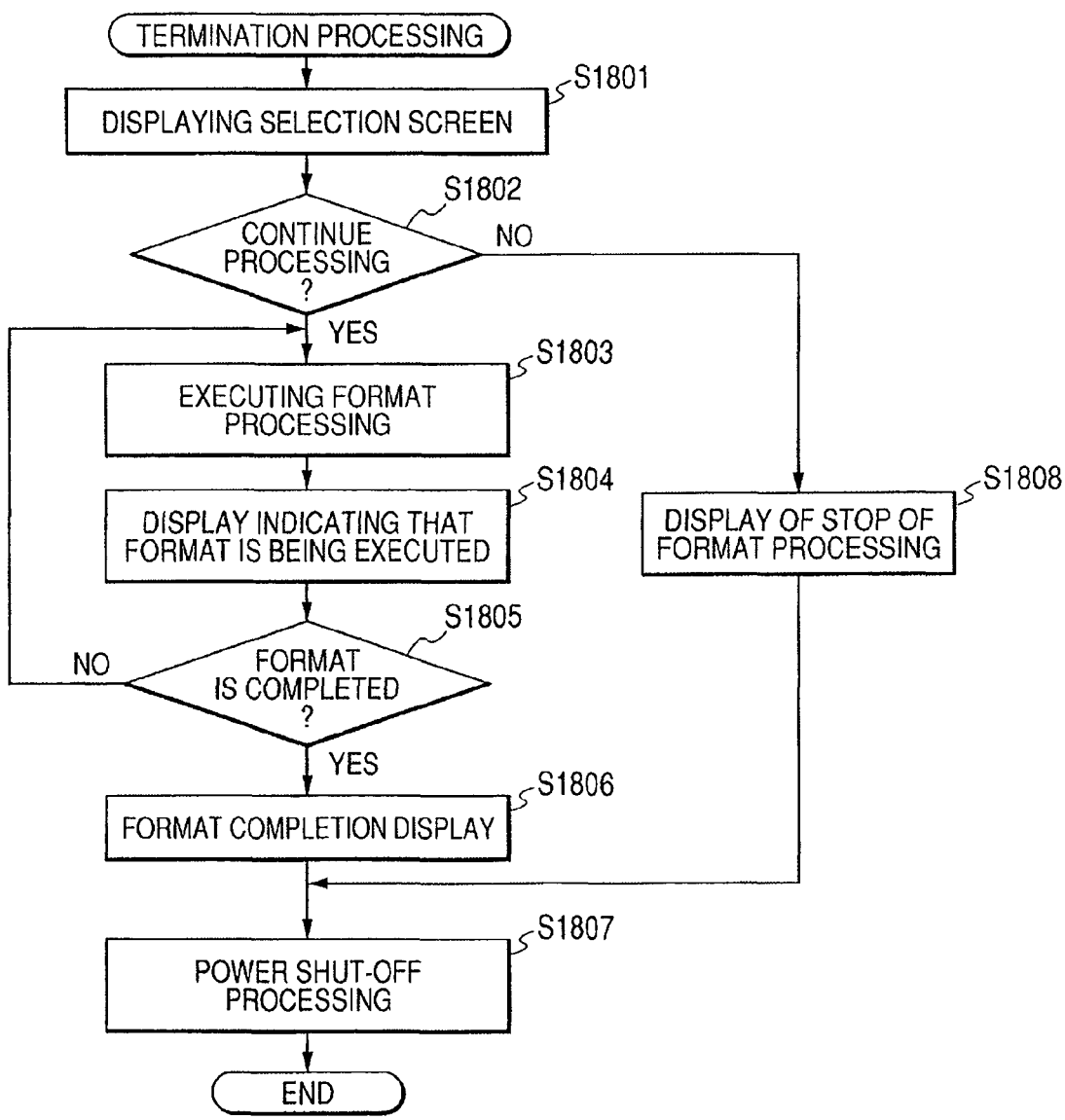
FIG. 18 is a flowchart illustrating processing that is performed upon powering off during format processing.

Processing at step S1311 in this embodiment is shown in FIG. 18.

Figure 19:
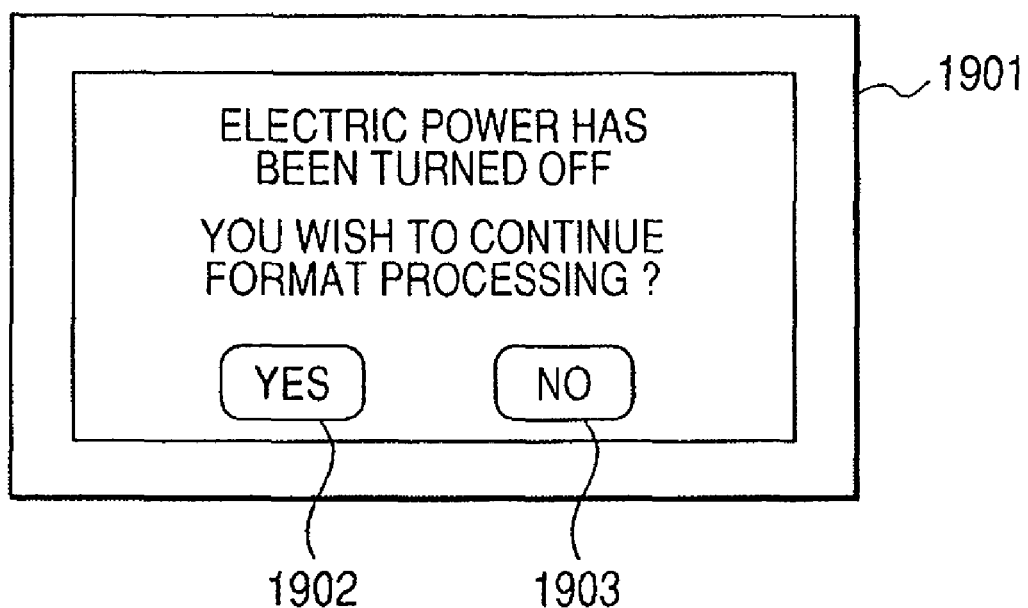
FIG. 19 shows a display screen that is presented in termination process.

In FIG. 18, a screen 1901 shown in FIG. 19 is first displayed on the display unit 210 (step S1801), and the flow waits for the user's selection of continuing processing or stopping formatting (step S1902). The user manipulates the operation unit 208 to select the button 1902 or 1903 on the display screen 1901.

If continuation of formatting is selected, the formatting is continued (step S1803) and the screen shown in FIG. 14A is displayed (step S1804). Then, it is determined whether the formatting is complete or not (step S1805), and if it is not complete, the flow returns to step S1803. If the formatting is complete, the screen of FIG. 14B is displayed (step S1806), and the power of the apparatus is shut off (step S1807).

Figure 17:
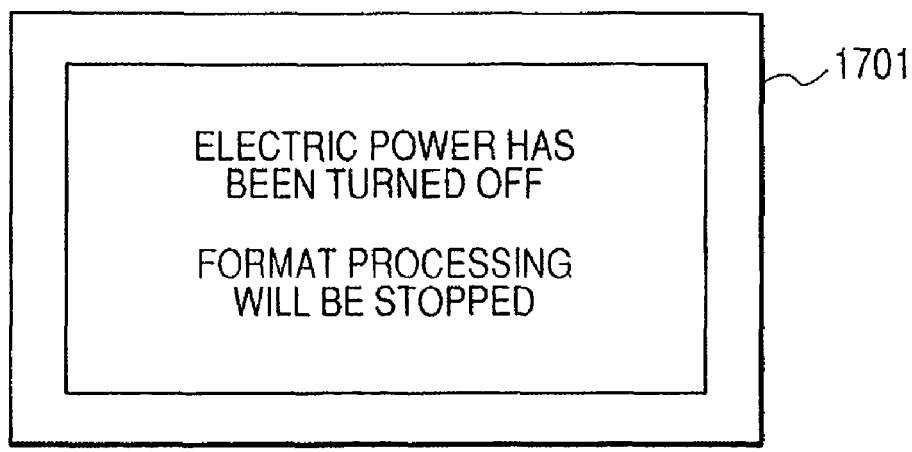
FIG. 17 illustrates a display screen for when an apparatus is powered off.

If stop of formatting is selected at step S1802, the screen of FIG. 17 is displayed (step S1808) and the power of the apparatus is shut off.

Now, the third embodiment will be described.

In this embodiment, complete formatting is switched to partial formatting if power-off is instructed at termination processing at step S1311.

Figure 20:
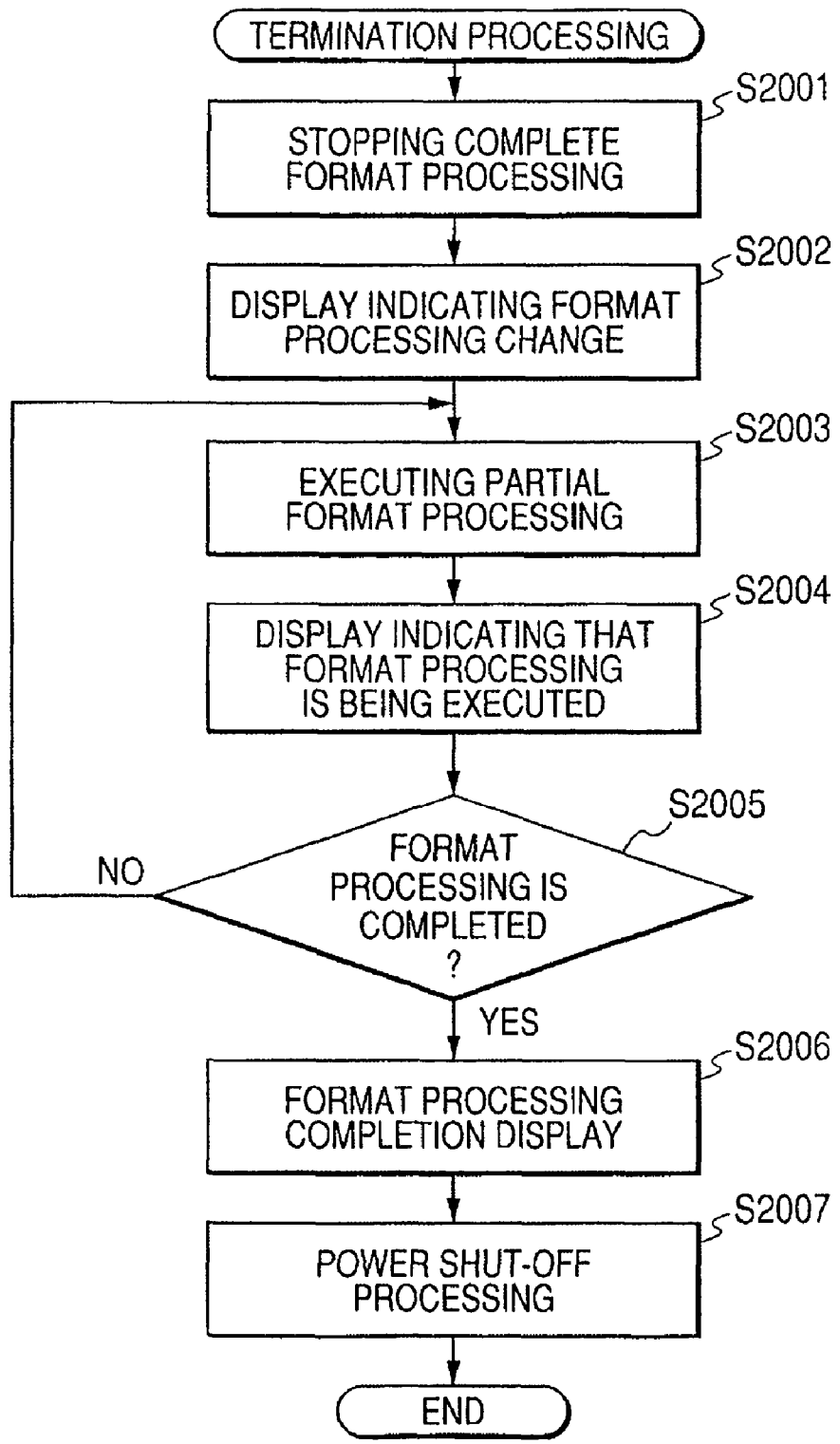
FIG. 20 is a flowchart illustrating processing that is performed upon powering off during format processing.

Processing at step S1311 in this embodiment is illustrated in FIG. 20.

Figure 21:
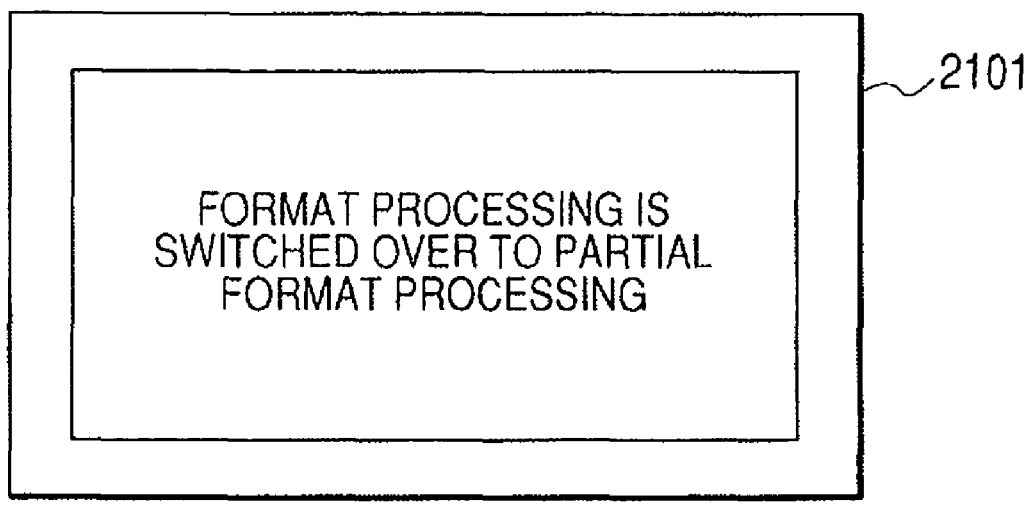
FIG. 21 shows a display screen presented in termination process.

In FIG. 20, complete formatting is first stopped (step S2001), and the screen 2101 shown in FIG. 21 is displayed on the display unit 210 to inform the user that complete formatting is to be switched to partial formatting (step S2002).

Then, partial formatting is executed (step S2003), and the screen for during formatting shown in FIG. 14A is displayed on the display unit 210 (step S2004). Thereafter, it is determined whether the partial formatting is complete (step S2005), and if the formatting is complete, the screen 1403 of FIG. 14B is displayed to inform the user that formatting has ended (step S2006) and the power of the apparatus is shut off (step S2007).

The fourth embodiment will be described next.

In this embodiment, continuation or discontinuation of formatting is determined depending on time required to complete formatting if power-off is instructed at termination processing at step S1311.

Figure 22:
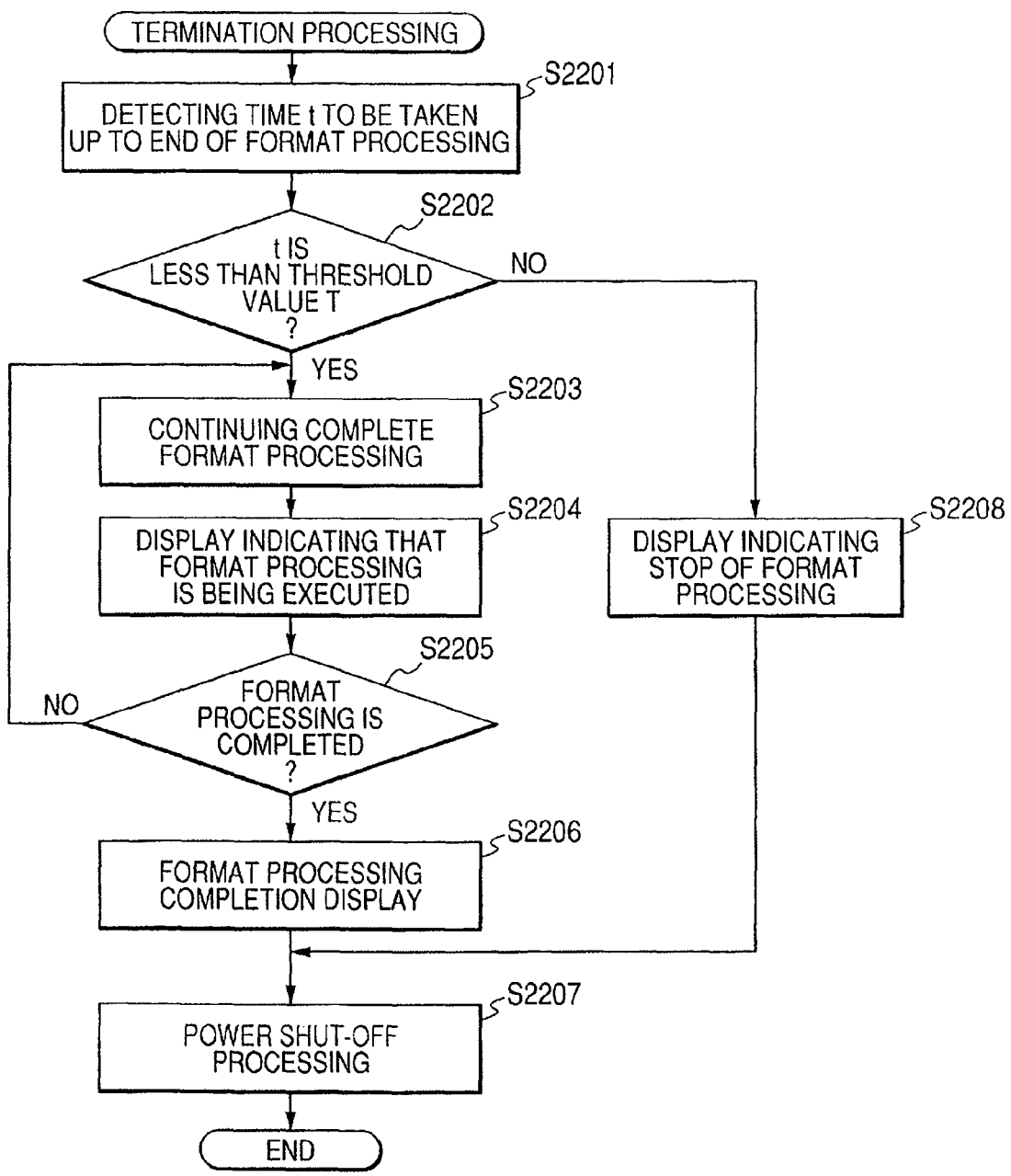
FIG. 22 is a flowchart illustrating processing that is performed upon powering off during format processing.

Processing at step S1311 in this embodiment is illustrated in FIG. 22.

In FIG. 22, time t that is required up to completion of complete formatting is first determined (step S2201), and time t is compared with a certain threshold value T (step S2202). If t is smaller than threshold value T, complete formatting is continued (step S2203), and the screen 1401 of FIG. 14A is displayed (step S2204). And when formatting is complete (step S2205), the screen 1402 of FIG. 14B is displayed (step S2206) and the power of the apparatus is shut off.

However, if t is equal to or greater than threshold value T at step S2202, the screen 1701 of FIG. 17 is displayed (step S2208), and the apparatus is powered off.

In this embodiment, since formatting is continued if time required for completion of the formatting is short when power-off is instructed during complete formatting in such a manner, a video camera that is convenient to users can be provided.

Next, the fifth embodiment will be described.

In this embodiment, the user optionally decides whether to continue formatting until it ends without turning off the apparatus, whether to switch to partial formatting, or whether to stop formatting at this point.

Figure 23:
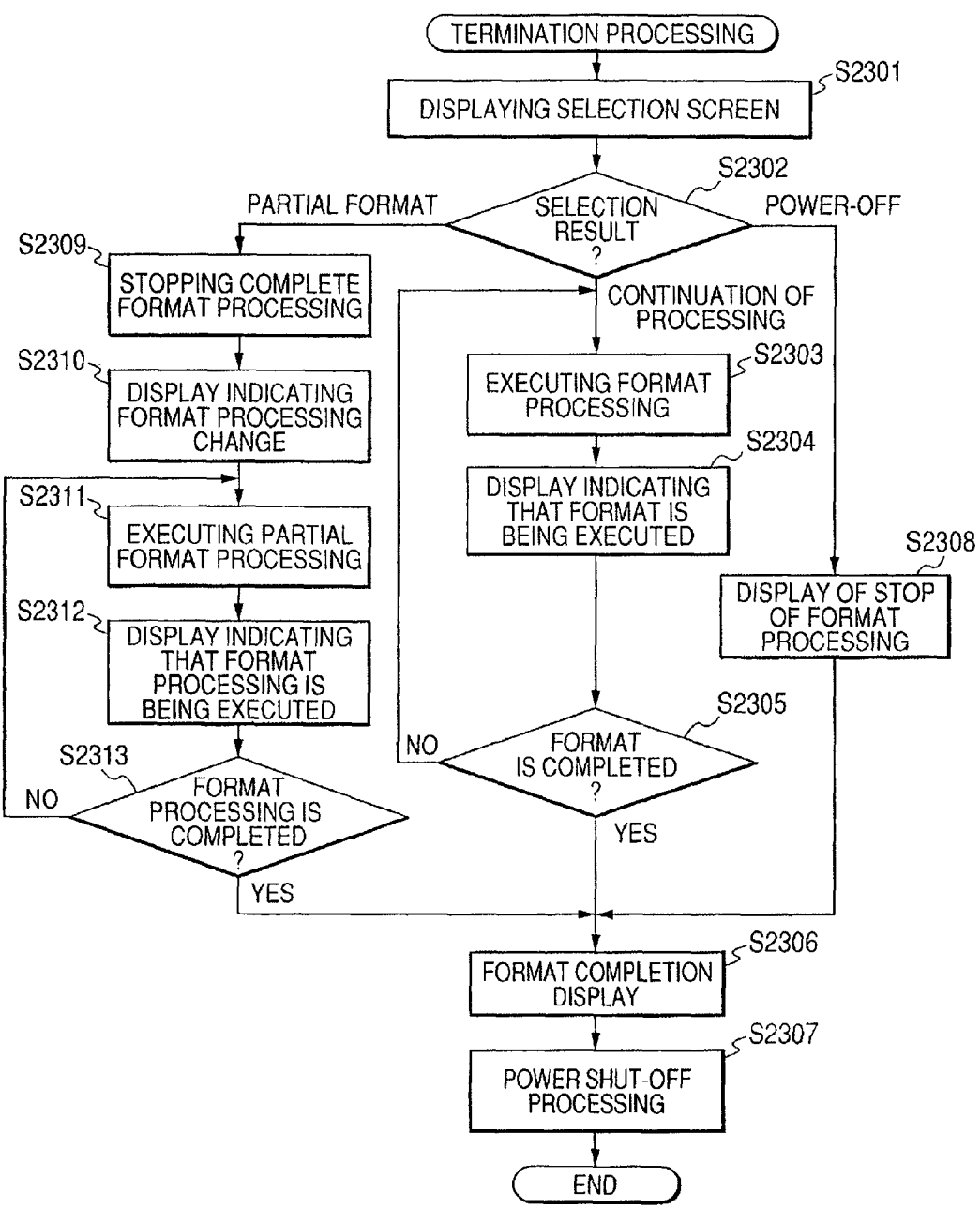
FIG. 23 is a flowchart illustrating processing that is performed upon powering off during format processing.

Processing at step S1311 in this embodiment is illustrated in FIG. 23.

Figure 24:
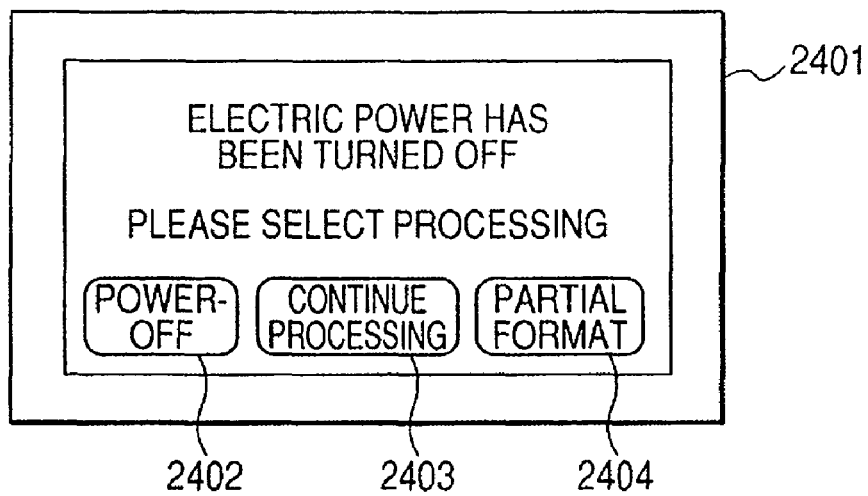
FIG. 24 shows a display screen presented in termination process.

In FIG. 23, the screen 2401 shown in FIG. 24 is first displayed on the display unit 210 (step S2301), and the flow waits for selection by the user of continuing the processing, switching to partial formatting, or stopping formatting (step S2302). The user operates the operation unit 208 to select one of the buttons 2402, 2403 and 2404 on the display screen 2401.

If continuation of formatting is selected, formatting is continued (step S2303) and the screen of FIG. 14A is displayed (step S2304). And it is determined whether formatting is complete or not (step S2305), and if it is not complete, the flow returns to step S2303. However, if formatting is complete, the screen of FIG. 14B is displayed (step S2306) and the power of the apparatus is shut off (step S2307).

If stop of formatting is selected at step S2302, the screen of FIG. 17 is displayed (step S2308) and the power of the apparatus is shut off.

If switching to partial formatting is selected at step S2302, complete formatting is stopped (step S2309), and the screen 2101 shown in FIG. 21 is displayed on the display unit 210 to inform the user that complete formatting will be switched to partial formatting (step S2310).

Then, partial formatting is executed (step S2311), and the screen of FIG. 14A, indicating that formatting is being executed, is displayed on the display unit 210 (step S2312). And it is determined whether the partial formatting is complete (step S2313), and if formatting is complete, the screen 1403 of FIG. 14B is displayed to inform the user of the completion and then the power of the apparatus is shut off.

The embodiments described above refers to use of an optical disk as storage medium, however, the present invention is also applicable to an apparatus that uses other storage media and has the capability of executing complete formatting or equivalent erasion process that takes a relatively long time as well as partial erasion.

Also, although the embodiments above describes processing that is done when power-off is instructed during formatting, it is also possible to provide the function of instructing not to shut off the power but to stop of formatting, and perform similar operations when stop of formatting is instructed.

Furthermore, needless to say, the aspect of the present invention can be achieved even by supplying a recording medium storing a program code of software realizing the function of the above-mentioned embodiment in a system or an apparatus, and allowing a computer (or a CPU or an MPU) of the system or the apparatus to read the program code stored in the recording medium for execution.

In this case, the program code itself read from the recording medium realizes the function of the above-mentioned embodiment, and the program code itself and the recording medium storing the program code constitute the present invention.

As the recording medium for supplying a program code, for example, a flexible disk, a hard disk, an optical disk, a magneto-optical disk, a CD-ROM, a CD-R, a magnetic tape, a nonvolatile memory card, or a ROM can be used.

Furthermore, needless to say, by executing the program code read by the computer, the function of the above-mentioned embodiment can to realized, and also an OS (basic system or an operating system) operated on the computer performs partial or entire actual processing in accordance with an instruction of the program code, whereby the function of the above-mentioned embodiment can be realized by that processing.

Furthermore, needless to say, after the program code read from the recording medium is written in a memory provided in a function extension board inserted in a computer or a function extension unit connected to the computer, a CPU or the like provided in the function extension board or the function extension unit performs partial or entire actual processing in accordance with an instruction of the program code, whereby the function of the above-mentioned embodiment can be realized by that processing.

As described above, although the present invention has been described by way of preferable examples, the present invention is not limited to the above examples, and can be variously modified within the scope of claims.

This application claims priority from Japanese Patent Application No. 2005-207137 filed on Jul. 15, 2005, which is hereby incorporated by reference herein.

What is claimed is:

1. A recording/reproducing apparatus, comprising:
an access circuit adapted to record/reproduce information data on/from a recording medium;
an initialization circuit adapted to initialize said recording medium in one of a first initialization mode in which information data recorded in recording areas of said recording medium is erased and a second initialization mode in which management data for managing the information data recorded on said recording medium is erased from certain areas of said recording medium and erasing is not performed on recording areas other than the certain areas;
an instruction input circuit adapted to receive a power-off instruction of said apparatus; and
a controller adapted to control said initialization circuit,
wherein said controller determines whether said initialization circuit is initializing said recording medium in said first initialization mode or in said second initialization mode, and if said controller receives the power-off instruction during said initialization by said initialization circuit, then in accordance with said initialization being determined to be in said first initialization mode or in said second initialization mode, said controller controls whether said initialization by said initialization circuit is to be stopped or continued, respectively.

2. The recording/reproducing apparatus according to claim 1, wherein if said initialization by said initialization circuit is determined to be in said first initialization mode, then in accordance with the power-off instruction, said controller stops said initialization and shuts off power of the apparatus, and if the initialization by said initialization circuit is determined to be in said second initialization mode, then in accordance with the power-off instruction, said controller continues said initialization and shuts off the power of the apparatus after said initialization is complete.

3. The recording/reproducing apparatus according to claim 1, wherein if said initialization is determined to be in said second initialization mode, then in accordance with the power-off instruction, said controller continues said initialization and shuts off the power of the apparatus after said initialization is complete, further if said initialization is determined to be in said first initialization mode, then in accordance with the power-off instruction, said controller waits for an instruction to continue or discontinue said initialization from said instruction input circuit, and if continuation of said initialization is instructed, said controller continues said initialization and shuts off the power of the apparatus after said initialization is complete, or if discontinuation of said initialization is instructed, said controller stops said initialization and shuts off the power of the apparatus.

4. The recording/reproducing apparatus according to claim 3, wherein if said initialization is determined to be in said first initialization mode, then in accordance with the power-off instruction, said controller displays information for selecting one of continuation and discontinuation of said initialization, on a display device.

5. The recording/reproducing apparatus according to claim 3, wherein if said initialization is determined to be in said second initialization mode, then in accordance with the power-off instruction, said controller continues said initialization and shuts off the power of the apparatus after said initialization is complete, and if said initialization is determined to be in said first initialization mode, then in accordance with the power-off instruction, said controller further waits for an instruction from said instruction input circuit for switching from said first initialization mode to said second initialization mode, switches from said first initialization mode to said initialization mode in accordance with said instruction for switching to continue said initialization, and continues said initialization in said second initialization mode to shut off the power of the apparatus after said initialization is complete.

6. The recording/reproducing apparatus according to claim 1, wherein if said initialization is determined to be in said first initialization mode, then in accordance with the power-off instruction, said controller switches from said first initialization mode to said second initialization mode to continue said initialization, and continues the initialization in said second initialization mode to shut off the power of the apparatus after said initialization is complete, and if said initialization is determined to be in said second initialization mode, then in accordance with the power-off instruction, said controller continues said initialization and shuts off the power of the apparatus after said initialization is complete.

7. The recording/reproducing apparatus according to claim 1, wherein if said initialization is determined to be in said first initialization mode, then in accordance with the power-off instruction, said controller further compares time required to complete said initialization in said first initialization mode with a predetermined threshold value, and if the time required to complete said initialization is longer than said threshold value, said controller stops said initialization and shuts off the power of the apparatus without, and if the time required to complete said initialization is shorter than said threshold value, said controller continues said initialization and shuts off the power of the apparatus after said initialization is complete, and also if said initialization is determined to be in said second initialization mode, then in accordance with the power-off instruction, said controller continues said initialization and shuts off the power of the apparatus after said initialization is complete.

8. The recording/reproducing apparatus according to claim 1, further comprising
a communication unit adapted to transmit/receive said information data to/from an external device, wherein said initialization circuit performs initialization in accordance with an initialization instruction command received from said external device via said communication unit.

9. A recording/reproducing apparatus, comprising:
an access circuit adapted to record/reproduce information data on/from a recording medium;
an initialization circuit adapted to initialize said recording medium in one of a first initialization mode in which information data recorded in recording areas of said recording medium is erased and a second initialization mode in which management data for managing the information data recorded on said recording medium is erased from certain areas of said recording medium and erasing is not performed on recording areas other than the certain areas;
an instruction input circuit adapted to receive an instruction to stop said initialization; and
a controller adapted to control said initialization circuit,
wherein said controller determines whether said initialization circuit is initializing said recording medium in the first initialization mode or in the second initialization mode, and if said controller receives the stop instruction during the initialization by said initialization circuit, then in accordance with the initialization being determined to be in the first initialization mode or in the second initialization mode, said controller controls whether the initialization by said initialization circuit is to be stopped or continued, respectively.

10. The recording/reproducing apparatus according to claim 9, wherein
if the initialization is determined to be in said first initialization mode, said controller stops said initialization in accordance with the stop instruction, and if said initialization is determined to be in said second initialization mode, then in accordance with the stop instruction, said controller continues said initialization until said initialization is complete.

11. A recording/reproducing apparatus, comprising:
an access circuit adapted to record/reproduce information data on/from a disk recording medium;
an initialization circuit adapted to initialize said recording medium in one of a first initialization mode in which information data recorded in recording areas of said disk recording medium is erased and a second initialization mode in which only management data recorded in certain areas of said disk recording medium is erased and erasing is not performed on recording areas other than the certain areas;
an instruction input circuit adapted to receive a power-off instruction of said apparatus; and
a controller adapted to control power of said apparatus,
wherein said controller determines whether said initialization circuit is initializing said recording medium in the first initialization mode or in the second initialization mode, and if said controller receives the power-off instruction during the initialization by said initialization circuit, then in accordance with the initialization being determined to be in the first initialization mode or in the second initialization mode, said controller controls whether the power of said apparatus is to be shut off without waiting for completion of the initialization or after the initialization is complete, respectively.

12. A method for controlling a recording/reproducing apparatus, comprising:
an accessing step of recording/reproducing information data on/from a recording medium;
an initialization step of initializing said recording medium in one of a first initialization mode in which information data recorded in recording areas of said recording medium is erased and a second initialization mode in which management data for managing the information data recorded on said recording medium is erased from certain areas of said recording medium and erasing is not performed on recording areas other than the certain areas;
an instruction input step of receiving an instruction to shut off a power of said apparatus; and
a control step of controlling said initialization step,
wherein said control step includes a step of determining whether said initialization step is initializing said recording medium in the first initialization mode or in the second initialization mode, and if said control step receives the power-off instruction during the initialization in said initialization step, then in accordance with the initialization being determined to be in the first initialization mode or in the second initialization mode, said control step controls whether the initialization in said initialization step is to be stopped or continued, respectively.

13. A method for controlling a recording/reproducing apparatus, comprising:
an accessing step of recording/reproducing information data on/from a recording medium;

an initialization step of initializing said recording medium in one of a first initialization an initialization step of initializing said recording medium in one of a first initialization mode in which information data recorded in recording areas of said recording medium is erased and a second initialization mode in which management data for managing the information data recorded on said recording medium is erased from certain areas of said recording medium and erasing is not performed on recording areas other than the certain areas;

an instruction input step of receiving an instruction to stop said initialization; and a control step of controlling said initialization step, wherein said control step includes a step of determining whether said initialization step is initializing said recording medium in the first initialization mode or in the second initialization mode, and if said control step receives the stop instruction during the initialization in said initialization step, then in accordance with the initialization being determined to be in the first initialization mode or in the second initialization mode, said control step controls whether the initialization in said initialization step is to be stopped or continued, respectively.

14. A method for controlling a recording/reproducing apparatus, comprising:

an accessing step of recording/reproducing information data on/from a disk recording medium;

an initialization step of initializing said recording medium in one of a first initialization mode in which information data recorded in recording areas of said disk recording medium is erased and a second initialization mode in which only management data recorded in certain areas of said disk recording medium is erased and erasing is not performed on recording areas other than the certain areas;

an instruction input step of receiving an instruction to shut off a power of said the apparatus; and a control step of controlling power of said apparatus, wherein said control step includes a step of determining whether said initialization step is initializing said recording medium in the first initialization mode or in the second initialization mode, and if said control step receives the power-off instruction during the initialization in said initialization step, then in accordance with the initialization being determined to be in the first initialization mode or in the second initialization mode, said control step controls whether the power of said apparatus is to be shut off without waiting for completion of the initialization or after the initialization is complete, respectively,

* * * * *